3,606,550
METHOD AND APPARATUS FOR SETTING THE POSITION OF A BORE CUTTING TOOL
Arthur J. Proksa, Elmwood Park, Ill., assignor to Everede Tool Company, Chicago, Ill.
Filed Apr. 21, 1969, Ser. No. 817,976
Int. Cl. B27g 23/00
U.S. Cl. 356—171                                                13 Claims

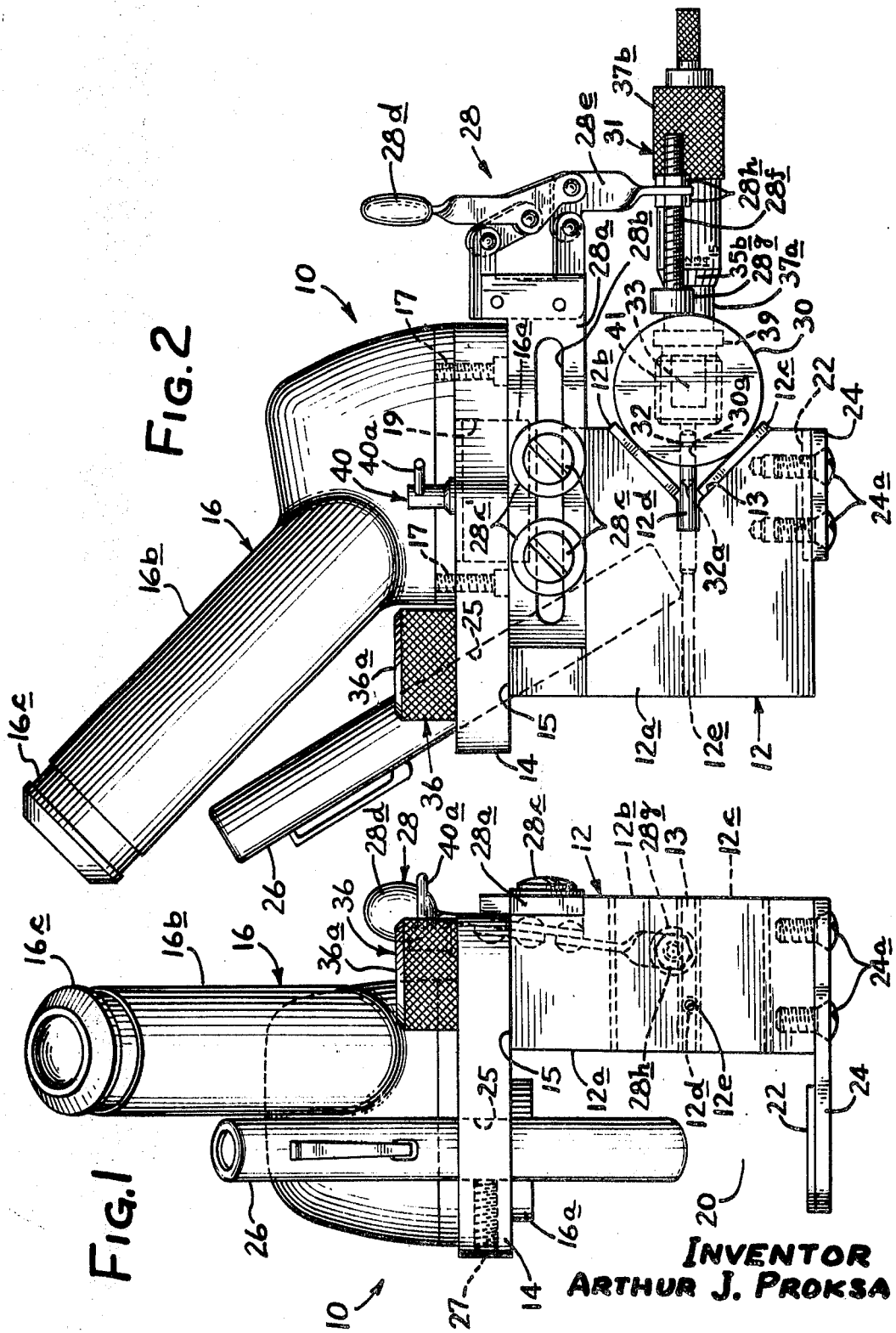

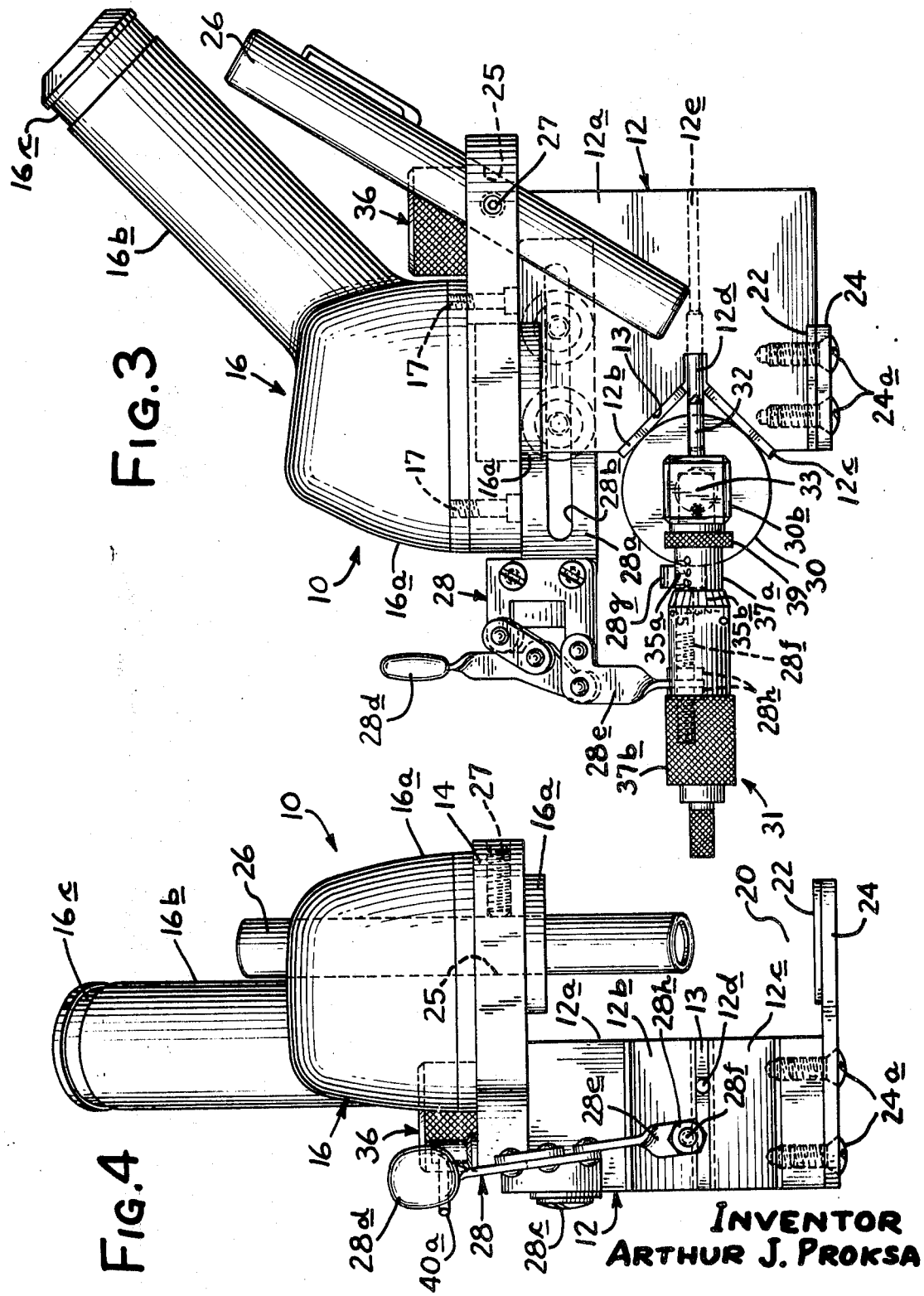

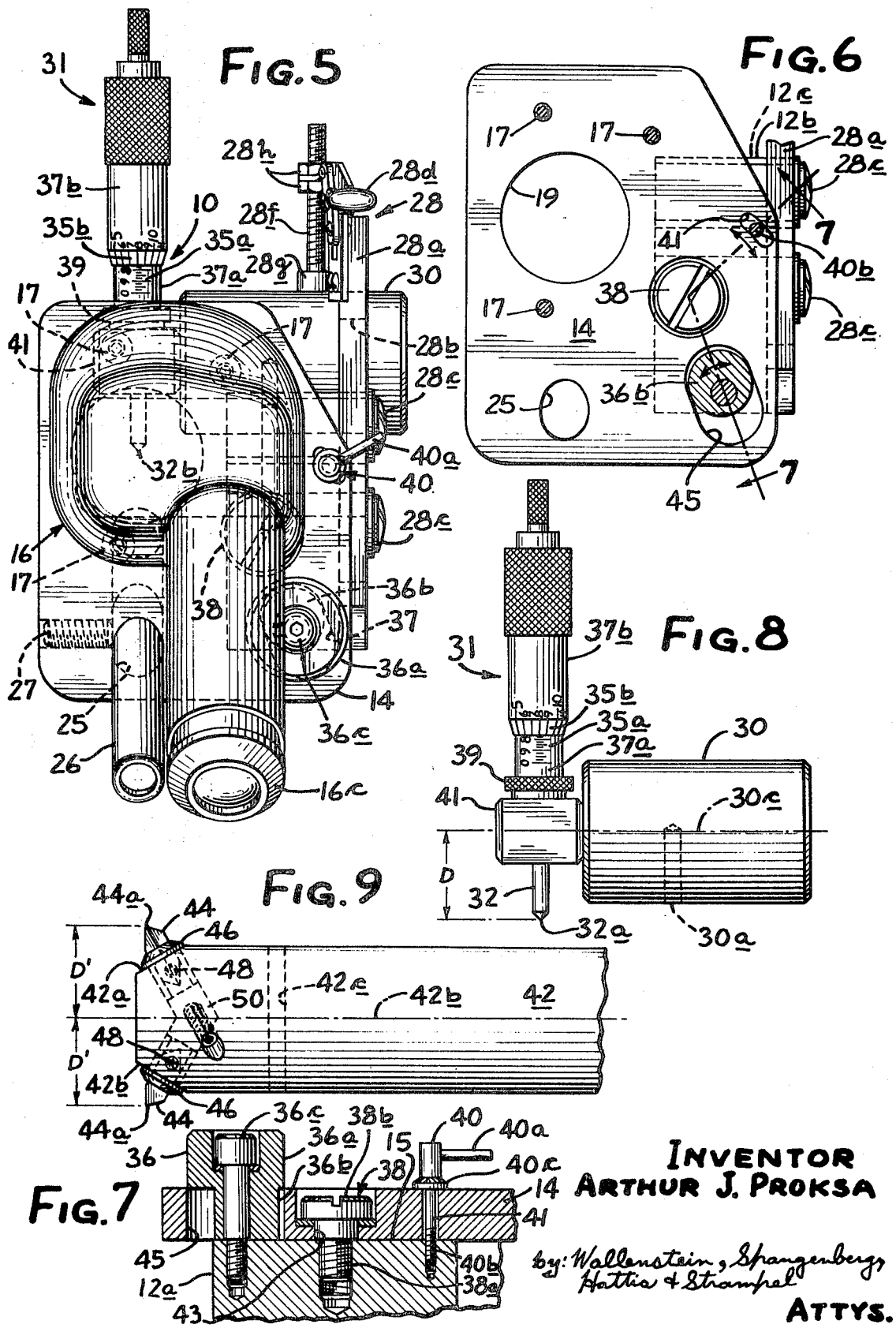

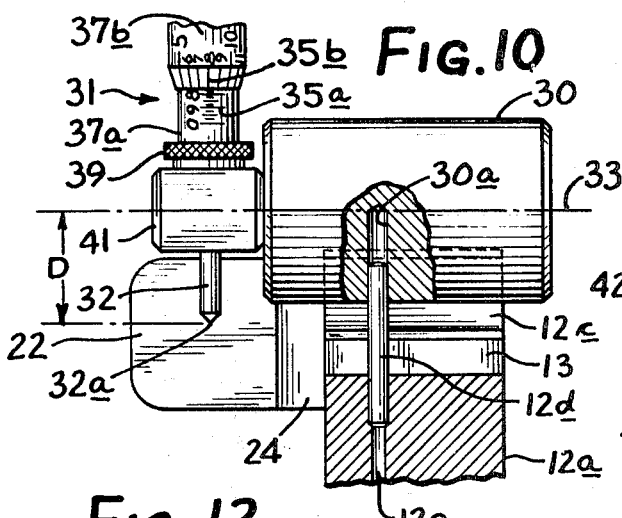
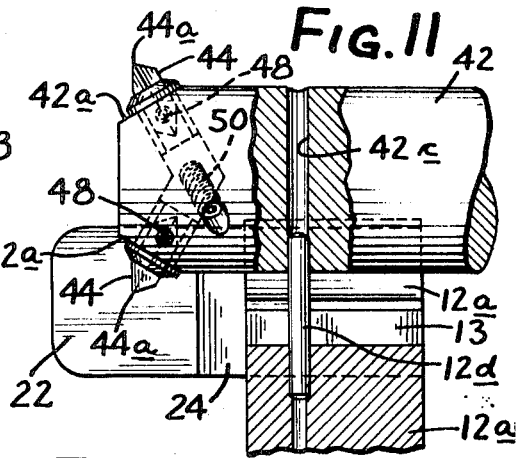
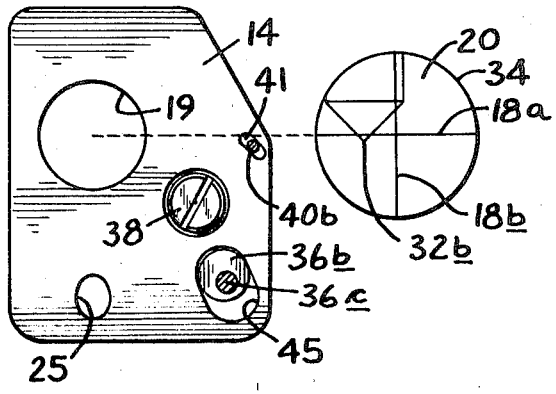
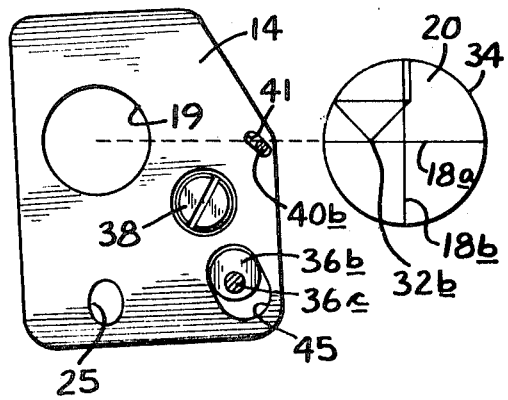
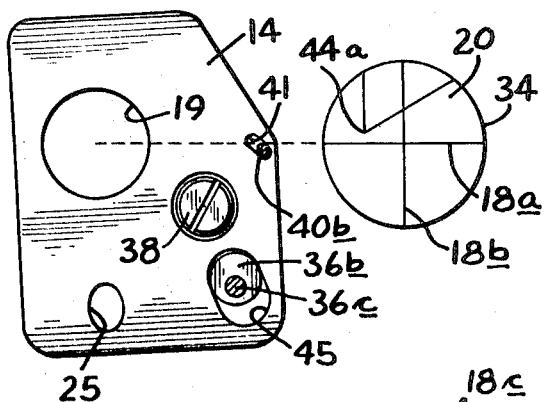
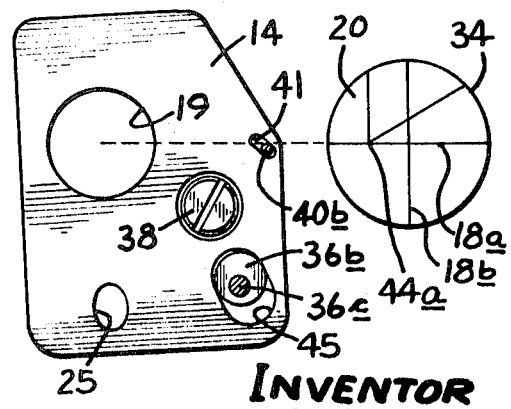
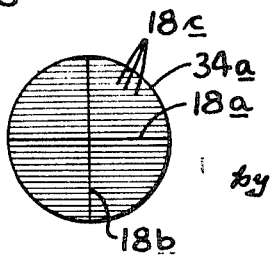

ABSTRACT OF THE DISCLOSURE

A light-in-weight magnifying device is provided having an adjustable boring bar receiving support frame and a magnifying viewing means providing a viewing field in which the adjustable tip portion of the boring bar tool bit or a radially extended portion of a dummy boring bar is visible in magnified form. The viewing field of the magnifying viewing means is provided with a reference marker, and the magnifying viewing member includes adjusting means for adjusting the relative position of the support frame and the viewing means so that the tip portion of the magnified image within the viewing field can be adjusted relative to said reference marker thus providing an indication of the exact radial extent from the axis of the boring bar or the dummy boring bar. The dummy boring bar carries a micrometer unit attached thereto, the micrometer unit having a radially extending member adjustable in position in precisely measurable amounts from the axis of the dummy boring bar body thus providing means for setting an initial radius dimension which is set up in the viewing field of the magnifying viewing means by adjusting the support frame so the top of the radially extending member of the micrometer unit is in registry with the reference marker. The magnifying device is then placed over the boring bar mounted on the head of a machine tool and the tool bit is adjusted to bring the tip thereof in registry with the reference marker.

---

This invention relates generally to bore cutting apparatus and more particularly to a method and apparatus for accurately positioning the cutting tip of a cutting tool with respect to the longitudinal axis of the cutting head associated with a boring machine unit. Specifically, this invention is directed to a setting and adjusting tool for use on boring machine units.

The machine tools of the types contemplated for use with this invention may be of several conventional kinds, as where, for example, there is provided a jig for holding securely a work piece which is to be bored. Here, a rotating cutting head moves relative to the work piece either by moving the cutting head along the longitudinal axis toward and away from the work piece or by moving the work piece along the longitudinal axis toward and away from the cutting head. Most advantageously, the cutting head comprises a boring bar which includes a tool bit holding member which removably carries on the outer end thereof one or two tool bits made of a special metal cutting material such as tungsten carbide. The end of the boring bar opposite the cutting tool bit or bits is inserted into the jaws of the boring head of the boring machine tool apparatus. Where a single tool bit is inserted in the boring bar, the size of the hole cut by the tool bit is determined by the distance between the longitudinal axis of rotation of the boring bar and the radial extent of the cutting tip of the cutting tool bit which projects from the outer end of the boring bar. Where the boring bar carries two tool bits, which generally extend from diametrically opposed sides of the outer end of the boring bar, the tool bits are generally carried by floating blocks such that the distance between the tips of the cutting tool bits automatically establish a diameter determined which is independent of any slight eccentricities between the axis of rotation of the rotating cutting head and the longitudinal axis of the boring bar. The degree of eccentricity of the longitudinal axis of the boring bar and the axis of rotation of the cutting head varies a slight amount each time the boring bar is removed from the cutting head (as, for example, for cutting tool bit adjustments) and then replaced thereon. any variation of this eccentricity at the inner end of the elongated boring bar is accentuated at the tool bit holding end thereof by the deflection of the boring bar which results in the boring of holes of inaccurate size.

In the case of a boring bar having a single tool bit, it is not convenient or readily possible to adjust accurately the size of the hole which is to be cut by the cutting tool bit without using a trial and error approach, as by making a rough adjustment by adjusting and measuring the distance between the longitudinal axis of the boring bar and the radial extent of the cutting tip of the cutting tool bit with suitable measuring instruments while the boring bar is removed from the boring machine, measuring the size of the hole which is bored and then making successive readjustments of the tool bit and successive measurements of the bored hole until the correct size is achieved. In replacing the boring bar back on the boring head it is very difficult if not impossible to exactly align the axis of the boring bar and the axis of the boring head as they were before the removal of the boring bar to make the necessary adjustments of the cutting tool bit. Therefore, the operator of a boring machine unit not only must expend great time and effort to set the precise radial extent of the cutting tool with respect to the axis of the boring bar but also the operator must use great care to replace the boring bar in the boring head so as to minimize any eccentricity variations.

Without the use of special adjusting equipment for setting the exact radial extent of a cutting tool bit accuracies in the order of ±0.002 inch are obtained. For more precise dimensioning, say in the order of ±0.0001 inch, it is necessary to use special adjusting equipment which, heretofore, has required heavy setting machinery for the purpose. Such setting machinery of the prior art is expensive as well as being very large and heavy, thus being a stationary piece of equipment many times requiring the user thereof to leave his station at a boring machine to set a precise dimension on the particular boring bar he is using. Therefore, the setting machinery of the prior art, in addition to having a high initial cost, may require more time to use thus increasing labor cost.

The setting apparatus of this invention, however, is relatively low in cost, lightweight, thus being readily portable, and provides substantially the same order of accuracies as the larger and more expensive setting machines. That is, the setting apparatus of this invention allows setting accuracies in the order of ±0.0001 inch at a much lower initial cost and the apparatus can be used at the operators work station, thus saving time.

Briefly, the apparatus of this invention includes a magnifying device having an adjustable boring bar receiving support frame and a magnifying viewing means providing a viewing field in which the adjustable tip portion of a boring bar cutting tool bit or a radially extended portion of a micrometer unit on a dummy boring bar is visible in magnified form. The viewing field of the magnifying viewing means is provided with a reference marker visible therein, and means are provided for adjusting the relative position of the support frame relative to the reference marker so the magnified tip can be brought in coincidence with the reference marker. In the alternative, the viewing field may be provided with a plurality of reference markers, such that one of the markers is the primary reference marker while the other markers are secondary reference marks, for reasons to be explained. The dummy boring bar used in making an initial adjustment is of the same diameter as the boring bar on the cutting machine unit which is to have the distance of the cutting tip from the boring bar axis adjusted to a desired value. The magnifying device of this invention is so portable and light in weight that it can be placed on the end of a boring bar supported on the rotatable head of a machine tool without significantly deflecting the same. Most advantageously, the magnifying device includes a microscope unit mounted on a support frame pivotally adjustable with respect to the microscope unit to cause the magnified tip visible within the eyepiece of the microscope unit to move toward and away from a hairline or other reference marker also visible in the eyepiece of the microscope unit. The micrometer unit on the dummy boring bar has an adjustable member extending perpendicular to the axis of the dummy boring bar. The dummy boring bar and the boring bar to be set have a reference mounting means, preferably a small hole, which receives a pin on the boring bar receiving support frame of the magnifying device, thus repeatably locating a fixed point of the support frame in the same relative position with respect to the boring bar or dummy boring bar fastened thereto.

In using the apparatus of this invention to set a precise dimension between the axis of a boring bar mounted on a rotatable head of a machine tool unit and an adjustable tool bit adjustably radially extending therefrom, the following steps are carried out. Firstly, the radial extent of the tip of the adjustable portion of the micrometer unit is adjusted to correspond to the radius of the bore to be cut. Then the dummy boring bar with the adjustable tip position attached thereto is placed in the boring bar receiving portion of the support frame such that the small hole formed in the dummy boring bar receives the pin on the support frame. Viewing the tip of the radially extending member of the micrometer unit within the viewing field of the microscope unit or other magnifying viewing means involved, the relative position of the reference marker within the viewing field and the magnified tip of the radially extending member of the micrometer unit is adjusted (such as by rotating the microscope unit relative to the support frame or vice versa) to bring the tip of the micrometer unit and hairline or other reference marker together. The adjustment, of course, must be maintained by locking the relatively adjustable parts in place. The dummy boring bar is then removed from the support frame of the magnifying device, and the boring bar receiving portion of the support frame is fastened to a boring bar on the cutting machine unit with the pin therein extending into a reference hole on the boring bar positioned the same distance from the tool bit as the reference hole in the dummy boring bar is positioned from the adjustable member of the micrometer unit carried thereby. The cutting tool bit is then automatically visible within the viewing field of the microscope unit or other magnifying viewing means. The tip of the cutting tool bit is then adjusted to coincide with the reference marker within the field, thus setting the radius of the hole to be bored.

This method will achieve a fairly high degree of accuracy but for degrees of accuracy of plus or minus .0001 inch will generally require a trial bore followed by only one more tool bit adjustment. In such case, after the hole is bored in a sample work piece, the diameter of the bored hole is accurately measured and the difference between the actual radius of the hole and the desired radius is then determined and the previously adjusted tip of the adjustable member of the dummy boring bar micrometer unit is advanced or retracted by the difference involved. The dummy boring bar and re-adjusted micrometer unit carried thereby is reinserted into the boring bar receiving portion of the magnifying device support frame. The relative position of the reference marker and magnified tip of the adjustable member of the micrometer unit is then adjusted to bring the same together with the viewing field of the microscope unit or other magnifying viewing means. The dummy boring bar is then removed from the magnifying device support frame and the support frame is again fastened to the boring bar on the head of the machine tool where the tool bit is finally adjusted as before to bring the magnified tip and reference marker into registry. To facilitate this second and final adjustment of the cutting tool bit, the viewing field of the magnifying viewing member may be provided with a plurality of graduated spaced apart parallel secondary reference markers on either side of a main reference marker, the secondary reference marker being distinguished, as for example, by line width, dot size, or color. Most advantageously, the secondary reference markers are formed of secondary hairlines which may be spaced apart from one another and from the main hairline a distance of .001 inch. Where the viewing field of the magnifying viewing means is provided with secondary reference markers in this manner, the final adjustment, if necessary, is somewhat simplified in that a second adjustment of the micrometer unit on the dummy boring bar is not needed. The support frame of the magnifying device is merely replaced on the boring bar of the cutting machine unit and the cutting tip adjusted away from or beyond the main reference marker to coincide with one of the secondary reference markers or by a fractional part of the distance between reference markers in the viewing field, this being a relatively simple visual procedure as a magnifying factor of 40 to 60 will adequately display a large visible spacing between the hairlines so a .0001 spacing can be visually approximated.

The above and other objects, advantages and features of the invention will be more fully realized and understood from the following detailed description, when taken in conjunction with the accompanying drawings wherein like reference numerals throughout the various views of the drawings are intended to designate similar elements or components.

FIG. 1 is a front elevational view of the tool bit setting apparatus of the invention;

FIG. 2 is a side elevational view of the apparatus of FIG. 1 showing the right side thereof with a dummy boring bar and its adjustable micrometer unit extension locked in position on the apparatus;

FIG. 3 is a side elevational view of the apparatus of FIG. 1 showing the left side thereof again showing the dummy boring bar and its adjustable micrometer unit extension locked in position on the apparatus;

FIG. 4 is a rear elevational view of the apparatus of FIG. 1;

FIG. 5 is a top view of the apparatus of FIG. 1 showing the dummy boring bar and its adjustable micrometer unit extension locked in position on the apparatus;

FIG. 6 is a plan view of the microscope support plate of the apparatus of FIGS. 1–5;

FIG. 7 is a sectional view of the microscope support plate taken along 7—7 of FIG. 6;

FIG. 8 is a plan view showing a dummy boring bar and its adjustable micrometer unit for setting precise radial dimension to be transferred to the apparatus of FIG. 1–5;

FIG. 9 shows a boring bar and the boring tool bits fastened thereto which are to be adjusted in accordance with this invention prior to cutting holes of the desired dimension;

FIG. 10 is a partial fragmentary view of the dummy boring bar and its adjustable micrometer unit mounted on the apparatus of this invention;

FIG. 11 is a partial fragmentary view showing the boring bar of FIG. 9 mounted on the apparatus of FIGS. 1–5;

FIG. 12 is a diagrammatic illustration showing one angular position of the microscope mounting plate of FIG. 6 and a representation of the microscope viewing field with the tip of the adjustable member of the micrometer unit in misalignment with respect to a hairline reference marker in the viewing field;

FIG. 13 is a diagrammatic illustration similar to that of FIG. 12 but illustrating the microscope support plate adjusted to a position where the hairline reference mark of the microscope viewing field is in registry with the top of the adjustable member of the micrometer unit;

FIG. 14 is another diagrammatic illustration of the microscope support plate of FIG. 6 and illustrating the top of the boring tool bit of FIG. 9 in the microscope viewing field and spaced from a hairline reference marker thereof;

FIG. 15 is a diagrammatic illustration similar to that of FIG. 14 but illustrating the tip of the boring tool bit adjusted to be in registry with the hairline reference marker; and FIG. 16 illustrates a modified form of a microscope viewing field which may be used in accordance with the broad aspects of this invention.

Referring now to FIGS. 1–5, a portable magnifying device 10 constructed in accordance with this invention is illustrated. The device is so light-in-weight that it can be easily manually raised and placed over the end of a boring bar extending from the rotatable head of a machine tool without significantly deflecting the same. For rigidly mounting the magnifying device 10 to a boring bar supported on the rotatable head of a machine tool and for securing a dummy boring bar to the magnifying device 10 there is provided a bar receiving support frame 12 adjustably receiving the flat portion 15 of a microscope support plate 14. A portion of the microscope support plate 14 extends outwardly from the boring bar receiving support frame 12. At this outwardly extended portion of the support plate 14 there is provided a magnifying viewing unit 16 fastened thereto and adjustably movable therewith. The magnifying viewing unit 16 is advantageously a light-in-weight portable microscope unit 16 rigidly secured to the support plate 14 by screws 17. The microscope unit may be a commercial unit not specifically made for the invention and, as illustrated includes a light receiving lens portion 16a (FIG. 4) which fits into or over an aperture 19 in the microscope support plate 14 and a mirror and image transmitting portion 16b terminating in an eyepiece 16c in which the magnified viewing field 20 (FIGS. 12–15) appears.

The boring bar receiving support frame 12 may be of any desired construction suitable for the purpose but here is illustrated as comprising a support block 12a having a channel 13 formed therein which receives confronting boring bar receiving pates 12b and 12c diverging outward in one direction and spaced apart at their innermost adjacent ends, to provide room for the passage of a fixed locator pin 12d tightly inserted in a locator hole 12e, (FIGS. 10 and 11). The locater pin 12d provides means for accurately locating boring bars or dummy boring bars of varying diameters at a precise location along the axis thereof to consistently locate the tip of either the cutting tool bit or the micrometer adjustable member involved within the viewing field 20 located beyond the end of the boring bar receiving plates 12b–12c.

A light reflecting surface 22 is positioned a slight distance below the viewing field 20 and maintained at a fixed position with respect to the support block 12a by means of an extended plate 24 secured to the support plate 12a by a pair of screws 24a. The light reflecting surface 22 will direct light through the viewing field to the light receiving portion 16a of the microscope unit 16 providing clear image magnification of components within the viewing field 20. Preferably, the viewing field 20 is illuminated by a small self-contained light source adjustably mounted to the support plate 14, as for example, by using a small pocket flashlight 26 or the like angularly positioned through an aperture 25 in the support plate 14 to direct light toward the light reflecting surface 22 without interfering with components placed within the viewing field 20. Although the magnifying device 10 is here shown with its own self-contained light source it will be understood that an exterior light source or light sources may be used if desired.

For mounting the magnifying device 10 upon boring bars of different diameters as well as for mounting dummy boring bars of different diameters upon the magnifying device 10 there is preferably provided an overcenter manually operatable clamp device 28 which cooperates with the diverging longitudinally aligned bar receiving plates 12b and 12c fixedly removably to secure such boring bars on the boring bar receiving support frame 12. The overcenter clamp device 28 includes a body portion 28a having an elongated slot 28b formed therein which receives a pair of aligned clamping screws 28c which, when loosened, permit the clamping device to be adjusted toward and away from the boring bar receiving plates to be operable with boring bars of varying diameters. When the clamping screws 28c are loosened the overcenter clamp device 28 is moved to an approximate position where, in the over the center position of the clamping device, a pressure pad 28g snugly bears against the boring bar involved. The head of the screws 28c may be provided with flat washers 28c' to increase the clamping area of the screws against the body portion 28a. A manually operated lever 28d is pivotally interconnected with a pivotable portion 28e connected to the body portion 28a by suitable links and pins as is customary for overcenter clamp devices of this type. A threaded shaft 28f carrying the pressure pad 28g is fastened to the pivotable portion 28e by means of a pair of lock nuts 28h thus providing means for a fine adjustment of the position of the pressure pad 28g.

To set the position of the tip of a cutting tool bit for boring holes of the desired diameter there is most advantageously provided a cylindrical dummy boring bar body 30 (FIG. 8) with a micrometer unit 31 radially extending therefrom. The micrometer unit has the usual adjustable pin 32 the tip 32a of which is spaced an adjustable distance D (FIG. 10) from a center axis 33 which corresponds with the longitudinal axis of the boring bar body. This distance is read on a conventional micrometer scale 35a and 35b respectively placed on a stationary shank 37a and rotatable cap portion 37b which advances or retracts the same as the cap portion is rotated in one direction or the other. The micrometer unit 31 has a locking sleeve 39 for locking the micrometer unit in position after a desired setting has been made. Preferably, the shank 37a of the micrometer unit 31 is fastened to an adapter block 41 attached to the dummy boring bar body 30.

To provide means for accurately locating the dummy boring bar body 30 on the boring bar receiving support frame 12 there is provided a locater hole 30a in the boring bar body 30 which hole snugly fits about the locater pin 12d extending from the diverging boring bar receiving plates 12b and 12c.

With the dummy boring bar body 30 secured in position on the boring bar receiving support frame 12 and with the desired radial extent of the micrometer pin tip 32a, the magnified tip 32a of the micrometer unit 31 will be seen in the viewing field 20 by viewing the same through the microscope eyepiece 16c of the microscope unit 16, as shown in FIG. 12.

A hairline reference marker 18a will be seen superimposed on the viewing field and adjustable relative to the micrometer pin tip 32a so it can be brought into registry with the micrometer pin tip 32a in the manified viewing field in FIG. 13. The preferred manner of making the position of the hairline 18a movable with respect to the micrometer pin tip 32a is by pivotally mounting the microscope support plate 14 upon the flat surface 15 of the boring bar receiving block 12a about an axis transverse to the axis of the boring bar receiving channel. A pivot screw 38 (FIG. 7) has a threaded shank 38a threading into a tapped hole 43 in the block 12a and a head portion 38b bearing against a counterbored portion of the microscope support plate 14. The angular position of the support plate is adjusted by means 36 preferably comprising a rotatable knurled knob 36a having an eccentric shank 36b engaging the side walls of an elongated aperture 45 formed in the support plate 14. The knurled knob 36a and the eccentric shank 36b are mounted for rotation about a standoff screw 36c which is threaded into the block 12a. When the eccentric shank 36b works against the side walls of the aperture 45 it will rotate the plate 14 about the pivot screw 38. The support plate 14 is locked in position on the support block 12a by a locking means 40 having a hand gripping portion 40a for manual operation, a threaded shank portion 40b extending through an aperture 41 in the support plate 14 and a radially outwardly extending shoulder portion 40c engaging the surface of the support plate 14 adjacent the aperture 41 to clampingly lock the support plate 14 and thus the hairline reference marker 18a in the desired fixed position where it is in registry with the micrometer pin tip in the magnified viewing field. After the hairline reference marker 18a is placed in registry with the micrometer pin tip 32a (FIG. 13) and the microscope support plate 14 locked in place, the assembly of the dummy boring bar 30 and the micrometer unit are removed from the boring bar receiving support frame 12. The correct spacing D locked in the magnifying device 10 of this invention is now capable of being precisely transferred to the cutting tool bits on a boring bar extending from the rotatable head portion of a machine tool.

FIG. 9 illustrates one kind of boring bar and boring tool bits associated therewith which may be accurately dimensioned by the method and apparatus of this invention. Here a boring bar 42 is provided with a pair of diametrically opposed boring tool bits 44 extending angularly outwardly of the boring bar 42 with the tips 44a of the boring tool bits located a given distance D' from the longitudinal axis 42b of the boring bar. Preferably, the boring tool bits 44 are of the throw-away type having triangular cross section with cutting edges formed at each end thereof. The boring tool bits 44 fit into removable sockets 46 which may be of the split-sleeve removable quill type clampingly locked together by set screws 48 threadedly inserted into the boring bar 42 in registry with the socket 46. The position of the cutting tool bits 44 are adjusted by socket head screws 50 associated with each cutting tool bit. With the set screws 48 loosened, the cutting tool bits are readily adjustable outwardly by turning the adjusting set screws 50 and readily adjustable inwardly by retracting the set screws 50 and manually pushing the cutting tool bits further into their respective sockets.

To accurately position and readily mount the magnifying device 10 on the boring bar 42 there is provided a locater hole 42c preferably extending completely through the boring bar perpendicular to and in alignment with the longitudinal axis 42b thereof. The locater hole 42c is substantially the same dimension as the locater hole 30a of the dummy boring bar body 30 of FIG. 8 and is positioned substantially the same axial distance from the boring tool bit as the dummy boring bar locater hole 30a is spaced from the micrometer unit pin 32. This ensures that the tip of the boring tool bit and the tip of the adjustable extension will be substantially precisely in the same location within the viewing field. The magnifying device locater pin 12d will snugly fit either end of the locater hole 42c so that one boring tool bit will be positioned in the viewing field 20 in one mounted position of the magnifying device and the other boring tool bit 44 will be positioned in the viewing field 20 in the other mounted position of the magnifying device.

When the magnifying device 10 is mounted on the boring bar 42, the tip 44a of one of the boring tool bits will be viewed in the magnified viewing field 20 and the location of the tip 44a relative to the hairline reference marker 18a will be seen, as illustrated in FIG. 14. In this case, the settings on the magnifying device 10 are not disturbed but the tool bit tip 44a is adjusted in position to bring the tip into registry with the hairline reference marker 18a, as seen in FIG. 15. The boring tool bit 44 is then set to the desired dimension D and is locked in position by its associated set screw 48. In the case of boring bars having two boring tool bits, as here shown, this procedure is repeated for the other cutting tool bit.

After the appropriate settings are made of the boring tool bits 44, a sample cut may be made in a work piece and thereafter the exact diameter of the hole cut determined by suitable measuring means. Should there be any difference between the actual dimension of the hole just-cut and the desired dimension of that hole, a final compensating adjustment is quickly and easily made by a single subsequent procedure, thus eliminating repeated trial and error methods. The single subsequent procedure following the initial setting of the boring tool bits requires that the difference between the actual dimension and the desired dimension of the sample hole cut be transferred to the micrometer unit 32 which may require either increasing or decreasing the dimension D set thereon by the difference referred to. For example, if the dimension is to be reduced by .005 of an inch, the tip of the micrometer unit pin 32 is retracted .005 of an inch and the dummy boring bar and micrometer unit assembly is remounted on the magnifying device 10 so that an adjustment of the hairline reference marker 18a can again be made to bring the marker into registry with the new position of the adjustable tip of the micrometer unit. The dummy boring bar and micrometer unit assembly are again removed from the boring bar receiving support frame 12 and the magnifying device 10 is again remounted on the boring bar 42 of FIG. 9 where the boring tool bits are adjusted to bring them into registry with the reference hairline marker 18a.

To eliminate the subsequent connection of the dummy boring bar to the magnifying device 10, it is contemplated within the scope of this invention to provide a modified magnified viewing field 34a of FIG. 16, which has the primary or main hairline 18a and a plurality of precisely finely spaced apart secondary hairlines 18c which, as a result of the magnification factor of the microscope or magnifying device, may represent easily distinguishable increments spaced apart by 0.001 inch. Therefore, after determining the actual dimension of the sample hole bored by the boring bar and comparing it with the desired dimension, the difference, if any, can be set on the cutting tool bits 44 merely by replacing the magnifying device 10 on the boring bar 42 and while viewing the appropriate cutting tip 44a adjusting the same to the appropriate secondary hairline 18c corresponding to the corrective difference of the initial and final adjustments.

Accordingly, this invention provides a relatively inexpensive method and apparatus for quickly and easily setting the cutting dimensions of boring bars by using a portable lightweight magnifying device sufficiently light in weight so as not to deflect or disturb the longitudinal axis of the boring bar, a condition giving rise to inaccurate cutting tip settings, and without the need of repeated trial and error settings to acquire the precise dimension desired. Therefore, it will be understood that variations and modifications of this invention may be effected without departing from the spirit and scope of the novel concepts defined in the appended claims.

I claim:

1. A method of setting a precised instance between the axis of a boring bar mounted on the rotating head of a machine tool unit and an adjustable tool bit adjustably radially extending therefrom comprising the steps of: providing a dummy boring bar body of the same size as said boring bar with a micrometer unit attached to the dummy boring bar body, the micrometer unit having a radially extending member adjustable in position in precisely measurable amounts from the axis of the dummy boring bar body; positioning the tip of the radially extending member of said micrometer unit a distance from the axis of said dummy boring bar body corresponding to a desired radius of the hole to be bored; placing the dummy boring bar body with the adjustable micrometer unit in the boring bar receiving portion of a support frame of a magnifying device which has a magnifying viewing means which shows the position of the magnified tip of the adjustable radially extending member of the micrometer unit relative to a reference marker within the viewing field of said magnifying viewing means, said support frame and reference marker being adjustable relative to one another to vary the relative position of said magnified tip of the adjustable radially extending member of the micrometer unit and reference marker, said magnifying device being so portable and light in weight that it can be placed upon the end of said boring bar mounted on the rotating head of a machine tool unit without significantly deflecting the same, adjusting said relative position so that the magnified tip of the said adjustable radially extending member is brought substantially into registry with said reference marker within the viewing field; removing said dummy boring bar body and micrometer unit carried thereby from said adjustable support frame; placing the boring bar receiving portion of said adjusted support frame of the magnifying device upon the boring bar mounted on the machine tool unit adjacent the adjustable tool bit so that the tip of the tool bit is visible within the viewing field of said magnifying viewing means; and adjusting the tip of said tool bit on the boring bar to bring the magnified tip visible within the viewing field substantially into registry with said reference marker within the viewing field.

2. A method of setting the precise dimension between the axis of a boring bar mounted on the rotating head of a machine tool unit and an adjustable tool bit adjustably radially extending therefrom according to claim 1 further including the steps of: making a sample boring cut with said adjustable tool bit after the initial setting thereof; measuring the dimension of said sample boring cut to determine if the hole formed thereby is of the desired dimension; again placing said dummy boring bar body with the adjustable micrometer unit in the boring bar receiving portion of said adjustable support frame of said magnifying device with the magnified tip of the adjustable radially extending member of the micrometer unit within the viewing field of said magnifying viewing means; adjusting the position of the tip of the radially extending member of the micrometer unit from its previously set condition either toward or away from the axis of said dummy boring bar body to compensate for the difference between the desired radius of the hole to be bored and the actual radius of the hole cut by the sample boring cut; again adjusting the relative position of the support frame and the reference marker to bring the magnified tip of the said adjustable radially extending member substantially into registry with said reference marker within the viewing field; removing said dummy boring bar body and micrometer unit carried thereby from said adjustable support frame; again placing the boring bar receiving portion of said adjustable support frame of said magnifying device upon the boring bar mounted on the machine tool unit adjacent the adjustable tool bit so that the tip of the tool bit is visible within the viewing field of said magnifying viewing means; and adjusting the tip of said tool bit on the boring bar to bring the magnified tip visible within the viewing field substantially into registry with said reference marker within the viewing field thus correcting any difference between the desired radius of the hole to be bored and the actual radius of the hole cut by the sample bore cut.

3. Apparatus for setting a precise distance between the axis of a boring bar mounted on the rotating head of a machine tool unit and the adjustable tool bit adjustably radially extending therefrom, comprising, in combination: a magnifying device so portable and light in weight that it can be manually placed upon the end of said boring bar mounted on the rotating head of a machine tool unit without significantly deflecting the same, said magnifying device having a boring bar receiving support frame and a magnifying viewing means providing a viewing field in which the adjustable tip portion of a boring bar tool bit or a radially extended tip portion of a micrometer unit carried by a dummy boring bar placed similarly in said boring bar receiving support frame are visible in a magnified form in said viewing field, said boring bar receiving support frame having a receiving portion for similarly removably receiving the boring bar or the dummy boring bar of the same size as said boring bar, said viewing means having a reference marker visible in the viewing field of said magnifying viewing means; a dummy boring bar receivable in said receiving porton of the support frame and a micrometer unit on said dummy boring bar which micrometer unit has a progressively radially extendable tip portion which extends a radial distance from the center of the dummy boring bar as indicated on a scale of the micrometer unit; and adjusting means for adjusting the relative position of said support frame and reference marker so that the magnified image of the position of the tip portion of the boring tool bit or the micrometer unit relative to said reference marker is adjustable in the viewing field.

4. The combination of claim 3 further including adjustable clamping means for clamping boring bars and dummy boring bars of various diameters in said boring bar receiving support frame of said magnifying device.

5. The combination of claim 3 wherein said magnifying viewing means includes the lens and eyepiece portion of a microscope and said support frame includes a light source for illuminating the viewing field of said microscope while selectively viewing the cutting tip of the cutting tool bit of said boring bar or the radially extended tip portion of the dummy boring bar.

6. The combination of claim 3 wherein said reference marker is a hairline visible in the viewing field of said magnifying viewing means, and said viewing means and said boring bar receiving portion of said frame are pivotally adjustable relative to one another to cause the magnified tip of the cutting tool bit or radially extended tip portion of said dummy boring bar to move toward and away from said hairline in said viewing field.

7. The combination of claim 3 further including locking means for locking the magnifying viewing member and said boring bar receiving portion relative to one another.

8. The combination of claim 3 wherein said receiving portion of said support frame has a pair of juxtaposed angularly displaced opposing surfaces in planes extending parallel to the direction of the axis of the boring bar or the dummy boring bar so boring bar and dummy boring bar bodies of various diameters are receivable thereby.

9. The combination of claim 8 wherein there is provided an adjustable clamp device positioned over said pair of angularly displaced opposing surfaces claimpingly to secure the magnifying device to the boring bar on a machine tool unit and for clamping said dummy boring bar body to the magnifying device.

10. The combination according to claim 3 in combination with a boring bar of identical size as said dummy boring bar and having a boring bar tool bit with an adjustable tip portion at the same axial and circumferential position relative to a reference point thereon as said extendable tip portion of said micrometer unit is located on said dummy boring bar relative to a reference point thereon and wherein there is provided a projecting locating means formed on one of said boring bar receiving support frame on the one hand and said boring bar and said dummy boring bar to be received thereby on the other hand, and a projection receiving recess formed on the other of same to locate said reference points of the boring bar and dummy boring bar at the same point on said suport frame so the adjustable tool bit of the boring bar and the extendable tip portion of the micrometer unit of the dummy boring bar are substantially at the same location within the viewing field.

11. The combination of claim 10 wherein said projecting locating means is a pin located at a predetermined location within the apex of a pair of diverging surfaces extending parallel to the axis of the boring bar or dummy boring bar and the boring bar and dummy boring bar are provided with a recess sized to receive said pin to fix the axial location of the boring bar or dummy boring bar.

12. The combination of claim 3 wherein said boring bar receiving support frame includes a block and a microscope support plate secured to said block and extending therefrom for receiving a microscope thereon, said support plate having a first aperture formed therein outwardly of said block for receiving the image-receiving lens portion of said microscope, which is located to have the viewing field thereof over the extended tip portion of said micrometer unit or over the adjustable tip portion of said boring bar tool bit, the eyepiece lens portion of said microscope being spaced therefrom for easy viewing by a user.

13. The combination of claim 12 wherein said support plate includes a second aperture for receiving a pin therethrough about which said support plate pivots to move the reference marker of the microscope attached thereto toward and away from the extended tip portion of said dummy boring bar or the adjustable tip portion of said boring bar tool bit in said viewing field, said support plate having a third aperture elongated in configuration displaced from said second aperture and an eccentric adjusting device positioned within said third aperture to manually adjustably pivot said support plate.

References Cited

UNITED STATES PATENTS

| | | | |
|---|---|---|---|
| 1,727,875 | 9/1929 | Gallasch | 356—168 |
| 2,006,854 | 7/1935 | Winter | 33—185 |
| 2,625,749 | 1/1953 | Arp | 33—185 |
| 2,794,362 | 6/1957 | Yale | 350—85 |
| 3,438,690 | 4/1969 | Skerman | 350—81 |

FOREIGN PATENTS

| | | | |
|---|---|---|---|
| 713,958 | 1954 | Great Britain | 356—168 |
| 148,528 | 1962 | U.S.S.R. | 350—10 |

RONALD L. WIBERT, Primary Examiner

J. ROTHENBERG, Assistant Examiner

U.S. Cl. X.R.

33—185; 73—104; 350—10, 81; 356—156